April 17, 1934.   H. E. PRATT   1,955,654
PEANUT AND POPCORN MACHINE
Filed Sept. 8, 1930   2 Sheets-Sheet 1
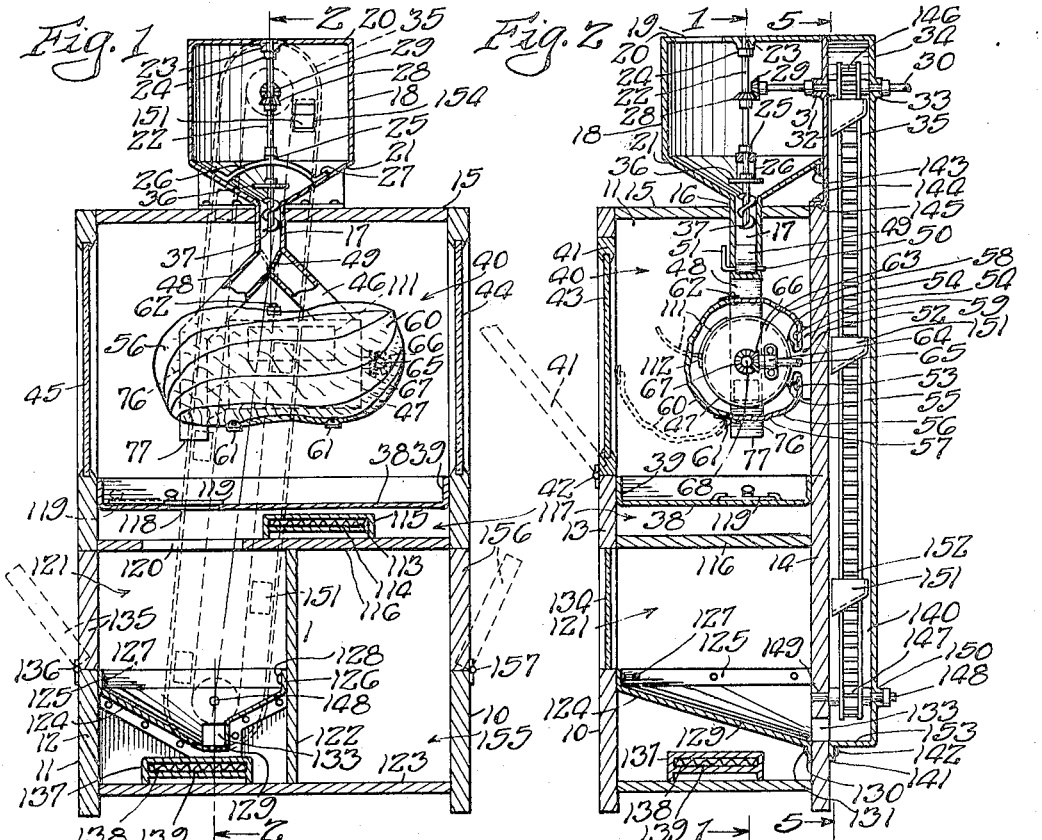
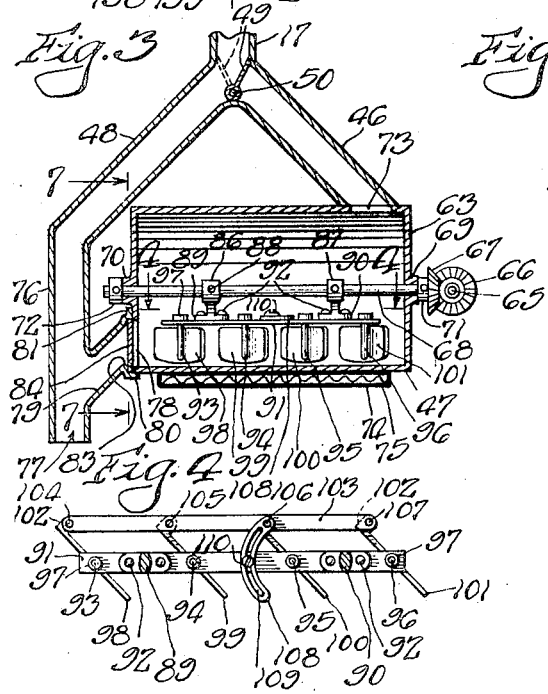
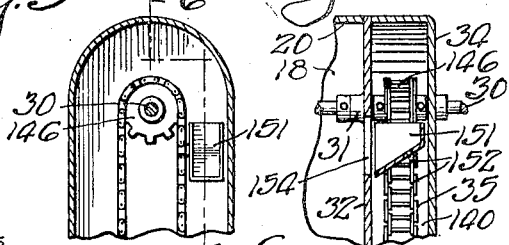
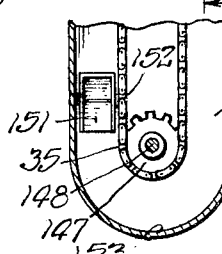
Herbert E. Pratt
INVENTOR
BY Victor J. Evans
HIS ATTORNEY.

April 17, 1934.  H. E. PRATT  1,955,654
PEANUT AND POPCORN MACHINE
Filed Sept. 8, 1930  2 Sheets-Sheet 2
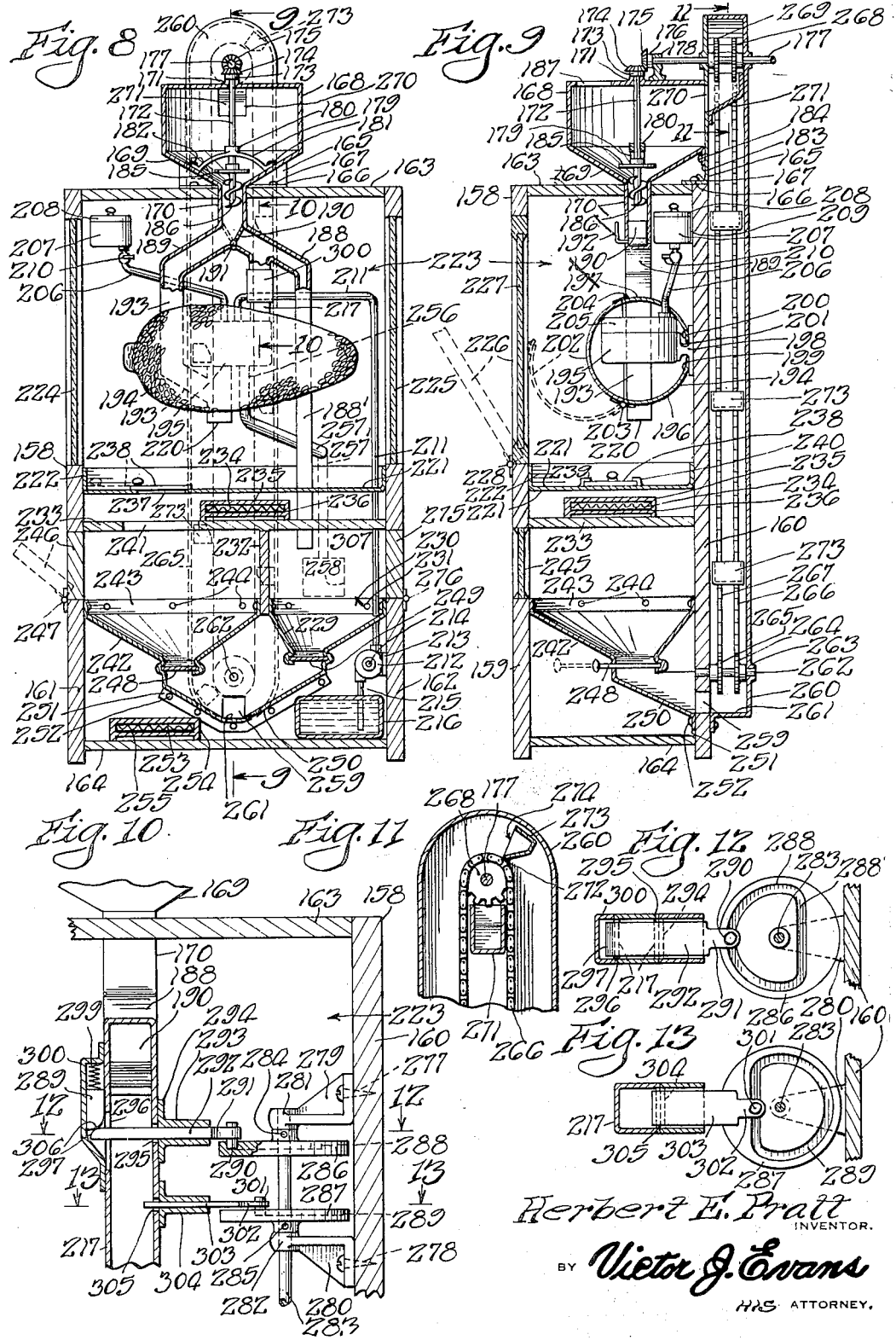
Herbert E. Pratt
INVENTOR.
BY Victor J. Evans
HIS ATTORNEY.

Patented Apr. 17, 1934

1,955,654

UNITED STATES PATENT OFFICE 1,955,654

PEANUT AND POPCORN MACHINE

Herbert E. Pratt, Chicago, Ill.

Application September 8, 1930, Serial No. 480,575

4 Claims. (Cl. 40—126)

This invention relates to certain novel improvements in peanut and popcorn machines, and has for its principal object the provision of an improved construction of this character which will be highly efficient in use and economical in manufacture.

Among the several objects of my invention is the provision of a novel and improved peanut roasting machine having certain features highly advantageous for the display and sale of peanuts, which feature will be pointed out specifically hereinafter.

Another object of the invention is the provision of an improved and novel construction of the character described herein in which peanuts are roasted in a roaster disposed in a housing shaped to resemble the shell of a peanut, and in which after the roasting operation is completed the peanuts are carried by certain mechanisms, to be described hereinafter, through a by-pass and are discharged in a continuous stream out of the shell-shaped housing thereby to present to public view, for the purpose of display and of inviting sales, the appearance of a constant roasting operation and a continuous stream of peanuts issuing from a shell-shaped housing resembling the shell of a peanut although the nuts are not actually being roasted as they are discharged from the shell-shaped housing but are merely passing by way of a by-pass around the roaster and through a peanut shell-shaped housing. My improved machine may, however, be so arranged that the roaster is used as a warmer and the nuts are then passed through the roaster into the lower part of a by-pass out of which the flow of nuts may be regulated at will.

A further object, ancillary to the foregoing objects, is the provision of an improved machine for roasting peanuts which embodies therein improved devices for warming and displaying peanuts.

Another object of the invention is the provision of a novel and improved popcorn machine which embodies certain features highly advantageous for the display and sale of popcorn, which features will be described more fully hereinafter.

A further object of the invention is the provision of a novel and improved popcorn machine of the character described herein in which the corn is popped in a popper housed in a shell shaped to resemble an ear of corn and in which after the popping operation has been completed the popped corn is carried to a warming oven by a passage concealed to public view, returned to the housing resembling an ear of corn and discharged therefrom through a by-pass whereby to present to public view for the purpose of inviting sales the appearance of a constant popping operation and a continuous stream of freshly popped corn issuing from a housing resembling an ear of corn, although the popped corn after the popping operation is suspended is merely passing through the housing resembling an ear of corn by way of a concealed by-pass not exposed to public view. If desired, however, the popped corn may be passed through the popper, the popper being then used as a warmer, and thence to the outlet end of the by-pass.

An additional object of the invention is the provision of a popcorn machine embodying improved devices for popping, warming, and displaying popcorn.

Still another object of the invention is the provision of an improved construction of the character described herein which will simulate a constant popping operation and thereby invite and arouse the curiosity of the public and consequently materially increase sales.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a sectional view taken substantially on the line 1—1 in Fig. 2 of a preferred form of construction of my improved peanut roasting machine;

Fig. 2 is a sectional view taken substantially on the line 2—2 in Fig. 1;

Fig. 3 is a fragmentary sectional detail view of the roaster and mechanisms associated therewith;

Fig. 4 is a sectional view taken substantially on the line 4—4 in Fig. 3;

Fig. 5 is a sectional view taken substantially on the line 5—5 in Fig. 2;

Fig. 6 is a sectional view taken substantially on the line 6—6 in Fig. 5;

Fig. 7 is a sectional view taken substantially on the line 7—7 in Fig. 3;

Fig. 8 is a vertical sectional view of a modified form of construction of the machine shown in Fig. 1 and in this instance depicting the invention as a popcorn machine;

Fig. 9 is a sectional view taken substantially on the line 9—9 in Fig. 8;

Fig. 10 is an enlarged fragmentary sectional detail view of certain mechanisms embodied in the structure depicted in Figs. 8 and 9 and taken substantially on the line 10—10 in Fig. 8;

Fig. 11 is a sectional view taken substantially on the line 11—11 in Fig. 9;

Fig. 12 is a sectional view taken substantially on the line 12—12 in Fig. 10; and Fig. 13 is a sectional view taken substantially on the line 13—13 in Fig. 10.

Heretofore in the art, peanut machines have been so arranged that after the roasting operation the peanuts were removed from the roaster and stored or displayed in a warming cabinet awaiting sale. In an analogous manner, popcorn machines have heretofore been so arranged that after the popping operation it has been customary to shut down the machine and store the popped corn in a warmer awaiting sale. Under the practice employed in the prior art no attempt has been made, so far as I am aware, to keep the popped corn and the roasted peanuts in motion and in public view after the popping and roasting operation with a view to attract the attention of the public thereto. It is accordingly among the several objects of my invention to provide novel mechanisms for arousing and stimulating interest in peanuts and popcorn after the roasting and popping operation by providing improved constructions in which the popped corn and roasted peanuts may be kept in continuous motion in public view for the purpose of stimulating the sale thereof.

Referring to the drawings wherein the preferred embodiments of my invention are illustrated, indicated at 10 and 11 are the side walls of a housing generically indicated at 12. Joined to the side walls 10 and 11 in any approved manner are the front wall 13 and the rear wall 14 of the housing 12. By referring to Figs. 1 and 2, it may be seen that there is extended across the top of the housing 12 a top wall 15 which is joined to the upright walls in any suitable manner. There is provided in the top wall 15 an opening 16 and inserted through this opening is the spout 17 of a hopper 18 which in the present instance is substantially funnel-shaped in contour. An inlet opening 19 is provided in the top wall 20 of the hopper 18 and a closure device of any approved type is preferably provided over the opening 19.

In the use of my invention raw peanuts are dumped into the hopper 18 through the opening 19 and it is manifest that the force of gravity will direct the peanuts toward the spout 18 by reason of the frusto-conical base portion 21 of the hopper 18.

Rotatably mounted in the hopper 18 is a shaft 22. At its upper end the shaft 22 is journaled in a bearing surface 23 provided on the upper wall 20 of the hopper and disposed below this bearing surface is a spacing collar 24. Adjacent its lower end the shaft 12 is journaled in a bearing 25 carried by a bracket 26. The bracket 26 includes foot portions 27 which are secured in any approved manner to the inner wall of the frusto-conical portion 21 of the hopper.

Carried by the shaft 22 is a bevel gear 28 and this gear meshes with a bevel gear 29 carried by a shaft 30 which is connected to a suitable source of power such as an electric motor. The shaft 30 is rotatably mounted in a bearing surface 31 provided on the rear wall 32 of the hopper 18 as best shown in Fig. 2, and the shaft 30 is likewise rotatably mounted in a bearing surface 33 provided on a wall 34 which houses a sprocket chain 35, the function of which will be explained hereinafter.

A flange 36 is provided on the shaft 22 in any suitable manner so as to be disposed above the upper end of the spout 17. Peanuts dropped into the hopper 18 through the opening 19 gravitate toward the flange 36 which agitates the peanuts discharged into the spout 17. It is manifest that when the shaft 30 is rotated, being in mesh with the gear 28 on shaft 22, shaft 22 will be rotated and likewise plate 36. Formed in the lower end of shaft 22 is a spiral screw 37 which permits the nuts from the hopper 18 to be discharged gradually at spaced intervals through the spout 17.

Extending between the front wall 13 of the housing 12 and the rear wall 14 adjacent the midpoint in the height thereof, and likewise extending between the side walls 10 and 11, is a tray 38 which includes an upstanding flange 39 that is secured to the walls of the housing 12 by means of any suitable connecting elements. The tray 38 forms the bottom of a compartment 40, access to which is provided by a door 41 hinged to the wall 13 by means of a suitable hinge construction 42. A transparent plate 43 such as glass is provided in the door 41 and similar transparent plates 44 and 45 are provided in the side walls 10 and 11 of the housing so as to permit the interior of the compartment 40 to be clearly visible for reasons to be made apparent hereinafter.

As best shown in Fig. 3, the spout 17 is bifurcated at its lower end to provide a chute 46 leading to a roaster housing 47 and to provide a chute 48 which forms a by-pass around the roaster housing 47 for reasons to be made apparent presently. Provided at the intersection of the chutes 46 and 48 is a damper 49 which is pivotally mounted on a shaft 50 which is journaled in the intersecting portion of the walls of the chutes 46 and 48. As best shown in Fig. 2, the damper shaft 50 includes a handle portion 51 which is disposed in the compartment 40 and accessible through the door 41.

The roaster housing 47 is supported by a bracket 52 which is secured to the rear wall 14 of the housing by means of suitable connecting elements such as screws 53 or the like. The bracket 52 includes a stem portion 54 in which is provided a concave face, and the roaster housing 47 is attached to the foot portion 54 of the bracket by means of suitable connecting elements such as screws 55 or the like. Surrounding the roaster housing 47 is a housing generically indicated at 56 and which, in the present instance is shaped to resemble the shell of a peanut. The housing 56 includes substantially similar stationary sections 57 and 58 which are secured to the bracket 59 by means of the connecting elements 53 and 54. The front section 60 of the housing 56 is hingedly mounted on the section 57 by means of suitable hinge constructions 61 so that the section 60 may be lowered into the position shown in dotted lines in Fig. 2 to permit access to the roaster 47. A suitable latch structure 62 is provided at the upper end of the movable section 60 so as normally to retain the section 60 in closed position.

Rotatably mounted in the end wall 63 of the roaster housing 47 by means of a bearing structure 64 is a shaft 65 which is connected to a suitable source of power such as an electric motor. The shaft 65 has mounted on its inner end in any approved manner a bevel gear 66 which meshes with a bevel gear 67 carried by a shaft 68 which projects longitudinally through the roaster housing 47. The shaft 68 is rotatably mounted in bearing surface provided in bosses 69 and 70 formed in the end walls of the roaster housing 47 and suitable spacing collars 71 and 72 are provided to prevent longitudinal movement of the shaft 68. It is manifest, therefore, that when the shaft 65 is rotated by means providing a suitable source of power gear 65 will drive gear 67 and thereby rotate shaft 68.

The peanuts are discharged from the hopper 18 through the spout 17 and chute 46, it being understood that the damper 49 is then in position shown in dotted lines in Figs. 1 and 3, into the roaster housing 47 through an opening 73 provided therein. Disposed below the roaster housing 47 and interiorly of the shell-shaped housing 56 is a heating element 74 which may be of any approved type and which is mounted on the lower side of the roaster housing 47 in any suitable manner. The heating element 74 is insulated from the roaster housing 47 by means of suitable insulation 75. A suitable switch control may be provided for the heating element 74 and disposed in any convenient position, such as on the rear wall 14 of the cabinet 10, and it is apparent that the nuts being disposed in the roaster housing 47 may be suitably roasted by the heating element 74. In this connection the roaster housing 47 is preferably made of heat conducting metallic material for reasons well known in the art. After the roaster 47 is filled the damper 49 is then thrown to open the by-pass which is allowed to remain open during the roasting operation. While the nuts in the roaster are being roasted other nuts from the hopper 18 are by-passed around the roaster so that the appearance is created that the nuts issuing from the by-pass are falling freshly roasted out of the roaster 47. After the batch of nuts in the roaster are roasted the supply of nuts from the hopper 18 to the by-pass is cut off by throwing the damper 49 and the roasted nuts in the roaster 47 are slowly discharged therefrom through the opening 78 which is controlled by a sliding door 84. When the roaster has been emptied the supply of nuts is then taken from the hopper 18 and thence passed into the roaster for warming and out of the roaster through the port 78, or by-passed around the roaster to simulate activity.

After a suitable quantity of the nuts have been roasted in the roaster 47 the damper 49 is moved into the position shown in solid lines in Figs. 1 and 3, so as to close the chute 46, and thereby prevent further discharge of the nuts from the hopper 18 to the roaster 47. It being understood that the shafts 30 and 22 are still rotating it is manifest that the nuts will then be discharged from the hopper 18, through the spout 17 into the chute 48. The chute 48 includes a portion 76 which provides a by-pass to one side of the roaster housing 47 but interiorly of the shell-shaped housing 56. This by-pass 76 projects downwardly through a suitable opening provided in the lower section 57 of the housing 56 and terminates exteriorly of the housing 56 as indicated at 77.

An opening 78 is provided in the end wall of the roaster housing 47 adjacent the by-pass 76 and communicating with this opening 78 is a chute 79 which opens at its lower end into the by-pass 76. At its upper end the chute 79 is rectangular in cross section and includes flanged portions 80, 81 and 82 which are welded or otherwise suitably joined to the housing 47. Formed in the chute 79 adjacent the upper end thereof is a shoulder 83 interiorly of which is slidably mounted a door 84 which, as best shown in Fig. 7, is slidable across the face of the outlet opening 78. Attached to the door 84 is a handle portion 85 to facilitate moving the door into open and closed positions. The arrangement of this door 84 is decidedly novel in the art since my improved device permits and is intended to enable the nuts to be discharged in slow succession out of the roaster 47 while heretofore in the art it has been customary to discharge the nuts out of the roaster as quickly as possible.

When the damper 49 is in position to close the chute 46 the nuts from the hopper 18 are discharged through the chute 48 and the by-pass 76 into the compartment 40 wherein they are then supported on the tray 38. There is provided in the roaster housing 47 certain mechanisms to be described presently which in addition to agitating the nuts during the roasting operation likewise function after the roasting operation to discharge the nuts from the housing 47 through the chute 79 into the by-pass 76 and thence into the compartment 40, it being understood that after the roasting operation is completed the sliding door 84 is moved into open position so as to open the outlet 84 from the roaster housing 47.

In this connection there is provided on the shaft 68 brackets 86 and 87 which are rigidly attached to the shaft 68 by means of keys 88 or the like. The brackets 86 and 87 include similar foot portions 89 and 90 which are secured to a bar 91 by means of suitable connecting elements such as rivets 92 or the like. Projecting through suitable openings formed in the bar 91 and rotatably mounted therein are similar pins 93, 94, 95 and 96 on which are provided similar heads 97. The pins 93, 94, 95, and 96 have saw slots provided therein and mounted in these slots in any approved manner, such as by welding, are blades 98, 99, 100 and 101 as best shown in Fig. 4. Similar ears 102 are provided on the blades 98, 99, 100 and 101 and these ear portions 102 are pivotally connected to a bar 103 by means of similar studs 104, 105, 106 and 107. Having one end secured to the stud 106 is a segment 108 in which an arcuated slot 109 is provided. The segment 108 is adjustably mounted on the bar 91 by means of a set screw 110.

It may be seen, therefore, by referring to Figs. 3 and 4, that the blades 98, 99, 100 and 101 are mounted for rotatory movement on the shaft 68. During the roasting operation these blades agitate the nuts in the roaster 47 to accomplish a gradual and uniform roasting of the nuts and to prevent burning thereof. It is manifest that these blades may be adjusted by means of the set screw 110 so as to assume various angular positions with respect to the shaft 68. During the roasting operation these blades serve to agitate the nuts and carry them around in the roaster to secure proper and uniform roasting while after the roasting operation is completed the blades may be set at an angle and then the rotatory movement of the blades propels the nuts toward the opening 78, it being understood that the door 84 is then partially opened to permit the nuts to be discharged slowly into the chute 79 and by-pass 76. Access to the roaster 47 for adjustment of the set screw 110 is provided by a door 111 hinged to the roaster 47 by means of a suitable hinge structure 112 as best shown in Fig. 2.

After the roasting operation is completed the door 84 is moved into open position and the roasted nuts are then discharged from the roaster 47 through the opening 78 into the chute 79, thence into the by-pass 76 and out of the by-pass 76 into the compartment 40 where the nuts may be allowed to accumulate in any desired quantity for display purposes. It may be seen by referring to Fig. 3, that as the shaft 68 is rotated the blades 98, 99, 100 and 101 will propel the nuts out of the drum through the opening 78 into the chute 79, it being understood that the door 84 is then opened to any desired extent according to the rapidity with which it is desired to expel the nuts from the roaster 47 into the chute 79, by-pass 76, and compartment 40. For warming the roasted nuts so displayed in the compartment 40 I provide a heating element 113 which is disposed in a housing 115 and insulated therefrom by means of suitable insulation 114. A suitable switch and rheostat for controlling the current input to the element 113 are preferably provided on the rear wall 14 of the housing 10. The housing 115 is supported on a horizontally extending shelf 116 which is secured to the walls 10, 11, 13 and 14 in any suitable manner, thereby defining a compartment 117 between the tray 38 and the shelf 116.

An opening 118 is formed in the tray or display shelf 38 and slidably mounted on the tray 38 so as to open and close this opening is a door or closure member 119. Provided in the shelf 116 and aligned with the opening 118 is an opening 120. It may be seen, therefore, by referring to Fig. 1 that the door 119 may be opened to allow a predetermined quantity of the roasted nuts to fall from the tray 38 through the openings 118 and 120 into a compartment 121. As is well understood in the art the nuts from the by-pass outlet 77 will accumulate on the tray 38 in a conical pile. When this pile is sufficiently large for display purposes and to permit sales therefrom the door 19 is allowed to remain open to permit additional nuts from the by-pass to fall down the pile and through the opening 118. The compartment 121 is defined by the rear wall 14, side wall 11, shelf 116, front wall 13, a partition 122 which extends vertically between the shelf 116 and the bottom wall 123 of the cabinet 12, and a pan 124 which will be described presently.

As shown in Figs. 1 and 2, the pan 124 which forms the bottom of the compartment 121 includes upstanding flange portions 125 and 126 at the sides thereof and these portions are secured to wall 11 and to the partition 122 by means of screws 127 and 128 or the like. Likewise included in the pan 124 is a depending flange 130 which is secured to the rear wall 14 of the cabinet by means of a screw 131 or the like. The pan 124 is shaped to provide a trough 129 which extends downwardly from the front wall 13 of the cabinet 10 to the rear wall 14 thereof as best shown in Fig. 2 wherein the inclination of the base 124 is illustrated. The trough 129 communicates at its lower end with an opening 133 formed in the rear wall 14 of the cabinet 10 adjacent the bottom thereof. It may be seen, therefore, by reference to Figs. 1 and 2, that as the nuts drop though the opening 120, in the manner described hereinbefore, they fall into the trough 129 and by reason of the angular inclination of this trough, gravitate rearwardly toward the opening 133. For the purpose of displaying to public view the action of the nuts dropping through the compartment 121 into the trough 129 a window 134 of glass or the like is provided in the front wall 13. To allow access to the compartment 121 a door 135 is provided in the side wall 11 and this door is mounted on a suitable hinge structure 136. Disposed below the pan 124 and mounted on the base 123 of the cabinet 10 is a housing 137 which contains a heating element 138 suitably insulated as indicated at 139. Suitable rheostat and switch controls may be provided at any convenient point on the cabinet 10 for controlling current input to this heating element 138 so as to warm the nuts in the trough 129.

The opening 133 provides an outlet for the nuts from the trough 129 to a housing 140 which is mounted on the rear wall 14 of the cabinet 10 and in the present instance is substantially oval-shaped in vertical section. The housing 140 is attached at its lower end to the rear wall 14 of the cabinet 10 by means of a flange portion 141 and a screw 142 or the like. In its upper end portion the housing 140 is closed by the wall section 32 which forms the rear wall of the hopper 18 to which the base 21 of the hopper 18 is attached by a rivet or the like 143. The flange 145 of the housing 140 is attached to the top 15 of the cabinet 10 adjacent the rear end thereof by means of a screw 144 or the like.

Rotatably mounted in the housing 140 is the chain 35 which in the upper end of the housing 140 is mounted on a sprocket 146 and similarly mounted on a sprocket 147 at the lower end of the housing 140. The sprocket 146 is carried by the shaft 30 and the sprocket 147 is mounted on a shaft 148, one end portion of which is journaled in suitable bearing surfaces 149 in the rear wall 14 of the cabinet 10. The opposite end portion of the shaft 148 is journaled in a bearing surface provided in a boss 150 on the rear wall 14 of the cabinet. Carried by the chain 35 at spaced apart intervals is a plurality of buckets 151 which are secured to the chain 35 in any suitable manner such as by links 152. The buckets 151 are provided with an open side which opens toward the rear wall 14 of the cabinet. It may be seen, therefore, by referring to Fig. 2, that when the nuts drop onto the pan 124, in the manner described hereinbefore, they will gravitate through the opening 133 into the housing 140 and be disposed on the bottom of the housing 140 indicated at 153. It being understood that the shaft 30 is connected to a suitable source of power such as an electric motor, it will be seen, therefore, that as the shaft 30 rotates the sprocket 146 will rotate chain 35 and attached buckets 151. As the buckets 151 are carried around the shaft 148 they pick up the nuts in the bottom of the housing 140 and as these nuts are carried upwardly they are retained in the buckets 151 by the rear wall 14 of the cabinet. As the buckets are moved upwardly past the rear wall 32 of the hopper 18 they encounter an opening 154 which is provided in the wall 32 as shown in Fig. 6. It is manifest, therefore, that the buckets 151 will drop the nuts contained therein into the hopper 18 and from the hopper 18 the nuts may be made to pass through the spout 17 and chute 48 into the by-pass 76. The nuts will therefore drop out of the by-pass 76 onto the tray 38 in such a manner that the impression is imparted to persons viewing the cabinet 10 and compartment 40 of a constant stream of freshly roasted peanuts falling out of the shell housing 60 and roaster 47 whereas in fact the nuts are not necessarily being roasted at this time but are merely being passed around the roaster 47 through the shell 56, to simulate the appearance of constant roasting and the discharge of freshly roasted nuts. It is readily apparent that this effect is novel and will be highly interesting to persons viewing the machine which will materially stimulate sales.

After a sufficient quantity of the nuts have accumulated on the tray 38 they may be allowed to drop through the openings 118 and 120 onto the pan 124 and the cycle of operations continued. It is to be noted that a quantity of nuts may be allowed to collect in a substantially conical or pyramidal pile on the tray 38 before opening the door 119 and after opening the door 119 the nuts dropped from the by-pass 76 will drop successively onto the pile and roll down the pile through the opening 118 onto the pan 124, after which the cycle of operations described hereinbefore may then be repeated.

Bags of roasted peanuts, peanuts in bulk, raw peanuts, or other material may be stored in the compartment 155, access to which is provided by a door 156 which is mounted on the rear wall 14 of the cabinet by means of a suitable hinge construction 157.

In Figs. 8 to 13 inclusive a modified form of construction is illustrated and in these figures my improved popcorn machine is depicted. Referring now more particularly to Figs. 8 and 9 a cabinet is generically indicated at 158 which comprises front and rear walls 159 and 160 and side walls 161 and 162. The cabinet 158 includes a top wall 163 and a bottom wall 164 which may be joined to the vertically extending walls in any approved manner. In a preferred form of construction of my invention, though not in all forms thereof, a hopper 168 is mounted on the top wall 163 of the cabinet. The hopper 168 includes a portion 165 providing the rear wall thereof. The rear wall portion 165 includes a foot portion 166 which is secured to the top wall 163 of the cabinet by means of suitable connecting elements such as screws 167. The hopper 168 includes a frustoconical neck portion 169 which terminates in a spout 170 which projects downwardly through a suitable opening provided in the top wall of the cabinet.

Provided on the top wall of the hopper 168 is a boss 171 in which is provided a suitable bearing surface in which is rotatably journaled the upper end portion of a shaft 172. As shown in Figs. 8 and 9, the shaft 172 projects downwardly through the hopper 172 and its upper end is provided with a collar 173, which is keyed to the shaft 172 in any suitable manner. Carried by the shaft 172 at its upper end is a bevel gear 174 which meshes with a similar bevel gear 174 carried by a shaft 177 which may be connected in any approved manner to a suitable source of power such as an electric motor. The shaft 177 carries a spacing collar 176 which is disposed between the gear 175 and an upstanding bearing 178 in which the shaft 177 is rotably mounted.

The shaft 172 projects downwardly through a collar 180 which provides a bearing surface and is formed on a bracket which includes legs 179 having foot portions 181 provided at the outer ends thereof. The foot portions 181 are secured to the neck portion 169 of the hopper 168 by means of suitable connecting elements such as screws 182. By referring to Fig. 9 it may be seen that the neck portion 169 of the hopper 168 has a depending flange 103 provided at the rear thereof which is attached to the rear wall 165 of the hopper by means of screws 184 or the like.

The shaft 172 has provided thereon a flange 185 below which is provided on the shaft 172 in any suitable manner a spiral screw 186. An opening 187 is provided in the top wall of the hopper 168 and it may be seen, by referring to Figs. 8 and 9, that when popcorn is dumped into the hopper through the opening 168 the corn is agitated above the spout 170 by the flange 185 and falls into the spiral screw 186, it being understood that the shaft 172 is being rotated by the shaft 177 through gears 175 and 174.

The spout 170 is bifurcated at its lower end to provide chutes 188 and 189, entrance to which is controlled by a damper 190 which is pivotally mounted on a shaft 191 which has an angularly formed end portion providing a handle 192.

The chute 189 is continuous with a by-pass 193 which leads through a housing generically indicated at 194 and which is shaped to resemble an ear of corn. The by-pass 193 is led through the housing 194 to one side of a popper enclosed in the housing 194 and generically indicated at 195. The housing 194 includes stationary sections 196 and 197 which are secured to a bracket 198 by means of screws 199 and 200 or the like, and these screws likewise attach the bracket 198 to the rear wall 160 of the cabinet 158 as shown in Fig. 9. The bracket 198 includes a foot portion 201 to which the popper 195 is secured in any approved manner such as by welding. The housing 194 includes a movable section 202 which is connected to the section 196 by means of a suitable hinge structure 203 and a suitable latch structure 204 is provided for securing the section 202 to the section 197 in normally closed position.

The popper 195 includes a removable cover 205 in which an opening is provided and extended through this opening is a pipe 206, which leads to a salt container 207 on which is provided a removable cover 208. The salt container 207 may be mounted in the cabinet 158 in any suitable manner such as by means of a bracket 209 which is secured to the rear wall 168 of the cabinet. Controlling the flow of salt to the popper 195 is a suitable valve structure 210 which is provided in the pipe 206. Likewise leading into the popper 195 is a pipe 211 which includes a vertically extending portion in which is connected a suitable pump structure 212 which is mounted on the rear wall 162 by means of a suitable bracket structure 213. The pump structure 212 may be of any approved type and includes a shaft 214 which is connected to a suitable source of power such as an electric motor. Communicating with the pump 212 is a pipe 215 which leads into a receptacle 216. The receptacle 216 is supported on the bottom panel 164 of the cabinet and is provided with a suitable inlet opening (not shown) through which may be poured any approved liquid material for the seasoning of popcorn such as the common vegetable oils imitative of butter. A spray is preferably provided in the mouth of the pipe 211, at the entrance to the popper 195, and it is manifest that when the pump shaft 214 is connected to a suitable source of power such as an electric motor provided with current input and switch controls, the oil from the receptacle 216 may be sprayed into the popper 195 in any predetermined quantity.

Opening into and integral with the chute 188 is a chute 217 which leads into the popper 195. Provided in the chute 217 is a valve structure illustrated in Figs. 10, 12 and 13 and to be described hereinafter. Raw corn from the hopper 168 passes through the spout 170, chute 188, and chute 217 to the popper 195, it being understood that the damper 190 is then disposed in the position shown in dotted lines in Fig. 8 so as to close the chute 189 and by-pass 193. A heating element of any approved type may be provided in the base of the popper 195 and it is understood that suitable current input and switch controls may be provided in any convenient position for this heating element such as on the rear wall 160 of the cabinet. An outlet spout 220 is provided under the popper 195 to permit the popped corn to fall from the popper 195 onto a tray or display shelf 221. By referring to Fig. 8 it may be seen that the angularly formed end portion of the by-pass 193 opens into the outlet spout 220. The spout 220 may be secured to the by-pass 193 and to the popper 195 in any suitable manner such as by welding or be formed integral with the by-pass 193. It is manifest, therefore, that in my improved machine I provide the novel arrangement of running both popped corn and raw corn into the machine through the same opening, though, of course, at different times.

The tray 221 includes an upstanding flange 222 which may be joined to the walls of the cabinet 158 in any approved manner and it may be seen, by referring to Figs. 8 and 9, that the tray 221 defines the bottom of a compartment 223. To permit the interior of the compartment 223 to be seen from the exterior of the cabinet and particularly to enable persons to see the popped corn falling out of the spout 220, which gives the appearance of popped corn falling out of a shell resembling an ear of corn, windows 224 and 225 of suitable transparent material such as glass are provided in the side walls 161 and 162 of the cabinet. A door structure 226 which includes a window 227 is provided in the front wall of the cabinet and mounted thereon by means of suitable hinge structures 228.

The valve structure in the chute 217 is so arranged, as will be explained hereinafter, that raw corn entering the chute 217 is allowed to drop into the popper 195 at predetermined intervals and in predetermined quantities. The chute 188 is continuous with an overflow pipe 188' which conducts any surplus of raw corn accumulating in the chute 217, through the pipe 188' and allows any overflow of raw kernels to be dropped onto a pan 229. The pan 229 provides the bottom of a storage compartment 307 for raw kernels and includes an upstanding rim 230 which is secured to the rear wall 160, side wall 162, front wall 159 and to a partition 232 by means of screws 231 or the like. The upper end of the partition 232 is secured in any suitable manner to a shelf 233 which is disposed below the tray 221 and which may be secured to the walls of the cabinet in any approved manner known in the art.

A heating element 234, similar to the heating element 113, is mounted on the shelf 233 for the purpose of warming the popped corn as it falls out of the spout 220 and accumulates on the tray 221. The heating element 234 is mounted in a housing 235 and insulated therefrom by suitable insulation 236. Current input and switch controls for this heating element are preferably provided on the rear wall 160 of the cabinet or in other suitable position. It is manifest that the popped corn from the popper 195 will fall through the spout 220 and accumulate in a substantially pyramidal or conical pile on the tray 221. To permit the popped corn to fall through the tray 221 after any desired amount has accumulated on the tray 221 an opening 237 is provided in the tray 221 and this opening is controlled by a slidable door or closure member 238 which is mounted between upstanding ears 239 and 240 provided on the tray 221. Disposed in alignment with the opening 237 and formed in the shelf 233 is an opening 241 which permits the popped corn to fall therethrough onto a pan 242. The pan 242 is preferably substantially funnel-shaped and includes a rim 243 which is secured to the front wall 159 of the cabinet, to the rear wall 160, to the side wall 161, and to the partition 232 by means of screws 244 or the like. To permit the popped corn to be seen falling through the opening 241 a window 245 is provided in the front wall 159 of the cabinet. To provide access to the pan 242 a door structure 246 is provided in the side wall 161 and this door structure is hingedly mounted to the side wall 161 by means of suitable hinge structures 247.

A sliding door structure 248 is provided in the bottom of the pan 242 and a similar door 249 is provided in the bottom of the pan 229. It may be seen, therefore, by referring to Figs. 8 and 9, that the doors 238 and 248 may be opened to allow the popped corn to fall from the tray 221 into a trough 250. The trough 250 includes a rim 251 which is secured to the rear wall of the cabinet by means of screws 252 or the like and by referring to Fig. 8 it may be seen that the walls of the trough 250 are formed integrally with one wall of the pan 242 and one wall of the pan 229. Mounted on the bottom panel 164 of the cabinet is a heating element 253 which is enclosed in a housing 254 and insulated therefrom by suitable insulation 255. Current input and switch controls may be provided for this heating element in any suitable position such as on the rear wall of the cabinet and it is apparent that the function of this heating element is to warm the popped corn disposed in the trough 250.

Opening into the base of the popper 195 is a pipe 256 across the mouth of which and at the base of the popper 195 a suitable screen is preferably provided so that unpopped kernels of corn may fall therethrough into the pipe 256, thence into pipe 257 integral therewith, and through a vertically extending pipe 257' to a container 258 which may be mounted in any approved manner such as on the rear wall 160 of the cabinet.

Raw kernels overflowing into the chute 188 fall therethrough onto the pan 229 and when the door 249 is open it is apparent that these kernels will fall into the trough 250. As shown in Fig. 9, the trough 250 slopes downwardly toward an opening 259 formed in the rear wall 160 of the cabinet and communicates therethrough with a housing 260 which is substantially similar to the housing 140 and similarly mounted on the rear wall of the cabinet.

Rotatably mounted adjacent the bottom 261 of the housing 260 is a shaft 262, one end portion of which is mounted in a bearing surface 263 provided in the wall of the housing 260 and the other end portion of which is journaled in the rear wall 160 of the cabinet. Mounted in any approved manner on the shaft 262 so as to be rotatable therewith are spaced apart sprocket gears 264 and 265. Rotatable on the gears 264 and 265 are similar chains 266 and 267, which are likewise rotatably mounted on gears 268 and 269 carried by the shaft 177 and keyed thereto in any approved manner.

An opening 270 is provided in the rear wall 165 of the hopper 168 and communicating at its lower end with this opening is a chute 271 which is disposed between the wall 165 and the housing 260 and welded or otherwise suitably mounted in position as shown in Fig. 9. Attached to the chains 266 and 267 by means of suitable connecting elements such as links 272 are buckets 273. The buckets 273 are provided with an open face, as indicated at 274 in Fig. 11, and it may be seen, by referring to Figs. 8 and 9, that as the chains 266 and 267 are rotated by a suitable source of power such as an electric motor connected to the shaft 177 the buckets 273 scoop up either the popped corn allowed to fall into the trough 250 and thence into the bottom 261 of the housing 260 or the raw kernels from the overflow pipe 188' and the storage compartment 307 as described hereinbefore. Carrying either the popped corn or raw kernels upwardly the buckets 273 dump this material into the chute 271 from which the material drops into the hopper 168. It is manifest, therefore, that popped corn may be fed past the plate 185, through the spiral 186, into the chute 189, through the by-pass 193 and out of the spout 220 so as to simulate the appearance of freshly popped corn issuing from the popper 195, it being understood that in this case the damper 190 is disposed as in Fig. 8 so as to close the chute 188.

When it is desired to feed the overflow of raw kernels from the chute 188 and overflow pipe 188' and from the storage compartment 307 it is apparent that this may be accomplished by opening the sliding door 249, access to which is provided by a door 275 which is hingedly mounted on the side wall 162 of the cabinet by means of suitable hinge structures 276. The door 275 being open, it is manifest that the raw kernels from the overflow pipe 188' will fall into the trough 250 and thence onto the bottom wall 261 of the housing 260 from which these raw kernels will be carried upwardly by the buckets 273 and dumped onto the chute 271. From the chute 271 the raw kernels drop into the hopper 168 and, the damper 190 being disposed so as to close the chute 189, the raw kernels are then fed into the chute 217 and thence into the popper 195 through the valve structure provided in the chute 217 which valve structure is illustrated in Figs. 10, 12 and 13 and which will now be described.

Mounted on the rear wall 160 of the cabinet by means of screws 277 and 278 or the like are spaced apart brackets 279 and 280 at the inner ends of which are provided bearings 281 and 282. Rotatably mounted in the bearings 281 and 282 is a shaft 283 which may be connected in any approved manner to a suitable source of power such as an electric motor and preferably the same motor that operates shaft 177. Keyed to the shaft 283 by means of keys 284 and 285 are cams 286 and 287 in which are provided similar grooves 288 and 289 as shown in Figs. 12 and 13. Disposed in the groove 288 is a follower 290 which is rotatably mounted in the neck portion 291 of a sliding valve plate 292. The valve plate 292 is slidably mounted in a guide 293 which includes a base 294 which is secured to the wall of the chute 217 in any suitable manner such as by welding. The valve plate 292 is slidable through an opening 295 provided in one wall of the chute 217 and opposite the opening 295 and formed in the other wall of the chute 217 is an opening 296. The end portion of the valve plate 292 is rounded as indicated at 297 and by referring to Fig. 10 it may be seen that this rounded end portion 297 has abutting engagement with the rounded end portion 306 of a plunger 298 to which is connected a spring 299. The plunger 298 and spring 299 are enclosed in a housing 300 which is secured to the chute 217 in any approved manner such as by welding.

As the raw kernels of popcorn fall into the chute 217 they fall upon the valve plate 292 and by referring to Fig. 12 it may be seen that when the shaft 283 is rotated by a suitable source of power the cam 286 is rotated. As the cam 286 is rotated the follower 290 travels in the groove 288 and when the plate 286 of the substantially semi-circular groove 288 it is manifest that the valve plate 292 will be withdrawn rearwardly so as to open the chute 217 and to permit the kernels to fall therethrough onto a sliding valve plate 303 which is reciprocally operated in a manner to be described presently and so operated as to be in position across the chute 217 when the valve plate 292 is in opened position.

Provided in the cam 287 is the groove 289 which is substantially semi-circular in contour and similar to the groove 288. Disposed in the groove 289 is a follower 301 which is similar to the follower 290. The follower 301 is rotatably mounted in the neck portion 302 of a sliding valve plate 303 which is slidably disposed in a guide 304 which is similar to the guide 293 and similarly mounted on the wall of the chute 217. The valve plate 303 which is slidable through an opening 305 provided in the wall of the chute 217 and by referring to Figs. 10, 12 and 13 it may be seen that the valve plate 303 is arranged to be in opened position when the valve plate 292 is in closed position in the chute 217. It is manifest, therefore, that the rotation of shaft 283 reciprocally operates the valves 292 and 303 so as to permit a predetermined quantity of raw kernels of popcorn to fall onto the valve plate 292, then onto the valve plate 303, and thence into the popper 195.

As the valve plate 292 moves into closed position across the chute 217 it is apparent that kernels of corn might become wedged between the inner end of this plate and the wall of the chute. To overcome this possibility I provide the plunger 298 which has the lower inner end portion thereof rounded as indicated at 306. It may be seen by referring to Fig. 10 that when the rounded edge portion 297 of the valve plate 292 reaches its innermost position it engages the rounded edge 306 of the plunger 298 so that any kernels of corn that may become wedged between these two rounded edges will force the plunger 298 upwardly against the action of the spring 299 thereby permitting any kernels so wedged to be released and to fall back into the chute 217 through the opening 296.

To recapitulate the operation of the embodiment of the invention shown in Figs. 1 to 7 inclusive: A quantity of raw nuts may be removed from storage compartment 155 and placed in the hopper 18, from which they will be fed by the feed mechanism 36—37 into the roaster 63 by way of chute 46, until the roaster is filled to roasting capacity, valve or damper 49 being set to open chute 46. Paddles 98 to 101 will be set in position parallel to the axis of shaft 68. Upon completion of the roasting operation the paddles 98 to 101 may then be set in position oblique to the axis of shaft 68 and so as to propel the nuts toward door 84 which will be opened to the desired extent. The nuts will then gradually fall through by-pass outlet 77 onto tray 38 in display compartment 40. A portion of the roaster nuts may then be placed in bags and disposed for sale on shelf or tray 38 and the remainder of the nuts allowed to accumulate under outlet 77 until a pile sufficient for display purposes has accumulated in compartment 40, whereupon door 119 will be partially opened and further nuts issuing from outlet 77 will fall through opening 118 into compartment 121. As soon as the supply of nuts in the roaster is exhausted door 84 may be closed and paddles 98 to 101 adjusted to agitating position and the roasting operation repeated until the hopper 18 is empty whereupon valve 49 may be set to open chute 48. The endless conveyor 35—151 may then be actuated and the surplus roasted nuts previously accumulated in compartment 121, will fall by gravity from compartment 121, down inclined trough 129 into outlet 133 from which they will be picked up by the buckets 151 of the endless conveyor which will carry the nuts to the hopper 18. The speed of the feed mechanism 36—37 may then be reduced and the roasted nuts slowly fed from the hopper through the by-pass 48 and out of outlet 77 into display compartment 40. Thus a steady stream of roasted peanuts may be caused to issue from outlet 77 into the display compartment 40, with the exception of the short time necessary to refill the roaster with raw peanuts. As a day's supply of peanuts may be frequently roasted in an hour, the display of roasted nuts issuing from the peanut shell-shaped casing 56 may be kept up practically continuously. When a supply of roasted peanuts has been stored in compartment 121, and it is not necessary to roast an additional supply for the day, the roasted nuts may then be conveyed from compartment 121 through hopper 18 and by-pass 48, using elements 113 and 138 for warming the nuts for sale.

To recapitulate the operation of the embodiment of the invention shown in Figs. 8 to 13: A supply of raw corn may be placed in compartment 307 through door 275. Door 249 may then be opened and the kernels allowed to fall by gravity into trough 250, through opening 259, to housing 260 wherein they will be picked up by the buckets 273 of the endless conveyor 266 and elevated to the hopper 168. Valve 190 may then be set to allow the feed mechanism 185—186 to discharge the raw corn into and through chute 188 into the chute 217, wherein the reciprocatory valve structure or measuring device shown in Figs. 10, 12 and 13 will feed the raw kernels in predetermined quantities into the popper 195, surplus kernels, if any, not handled by the measuring device passing by chutes 188 and 188' to storage compartment 307. At the time that the valve structure of Figs. 10, 12 and 13 feeds a measured quantity of raw corn into the popper a measured quantity of seasoning oil from container 216 may be injected into the popper. The popped kernels fall out of spout 220 onto tray 221 and the undersized or refuse kernels may be passed through spout 257 to the waste container 258. The popped corn is then piled up in compartment 223 and displayed for sale and the surplus is stored in the pan 242. After the desired stock of popcorn is attained, the popping action is stopped, door 229 is closed, the action of the measuring valves of Figs. 10, 12 and 13 is stopped, and likewise feed from the salt container and oil pump, and the action of conveyor 226—273 is continued until trough 250 and buckets 273 have been completely emptied of all grains of raw corn. Valve 190 is then set in the full line position of Fig. 8, and door 248 is opened, whereupon popcorn stored in the pan 242 will be fed by trough 250 through opening 259 and thence elevated by conveyor 226—273 to spout hopper 168 and 170 from whence the popcorn will pass through by-pass 189 and out of outlet spout 220, thus making it appear to observers of the display machine that the popcorn is falling freshly popped out of the popper which thus appears to be the housing 194. This display action is continued until the supply of popcorn in compartment 223 is depleted by sales when the above described cycle of operations may be repeated.

From the foregoing description of my invention it is manifest that I have provided a novel and improved construction in peanut and popcorn machines which while effectively accomplishing the roasting and popping operations and the several objects pointed out hereinbefore effectively adapted to stimulate public interest and curiosity whereby materially to promote the sales of peanuts and popcorn.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In an article displaying device, a cabinet including a display compartment having an inlet, a chute in the display compartment leading downwardly from the said inlet and having an outlet in the display compartment below said inlet, an endless conveyor for conveying the displayed articles from a point below the said chute outlet to the said first-named and display compartment inlet; the displayed articles being adapted to be fed by gravity from the chute outlet to the bottom of the conveyor, and means interposed between the said chute outlet and the bottom of the conveyor for regulating the gravity flow of the displayed articles from the chute outlet to the conveyor.

2. In an article displaying machine, a housing having inlet and outlet openings provided therein, a feed mechanism above and communicating with said inlet opening, and an endless conveyor for effecting continuous passage of articles from a point below said outlet to said feed mechanism for discharge thereby through said housing so that an observer will be given the counterfeited impression that the articles are continuously issuing from the housing.

3. An article displaying machine, comprising a cabinet including a display compartment, a housing in said compartment having inlet and outlet openings provided therein, a hopper above said inlet and opening thereinto, a feed mechanism in said hopper, and an endless conveyor for effecting continuous passage of articles from a point below said outlet to said hopper for discharge by said feed mechanism through said housing and display compartment so that an observer will be given the counterfeited impression that the articles are continuously issuing from the housing.

4. An article displaying machine, comprising a cabinet including a display compartment, a housing in said compartment, a chute leading through said housing and having an outlet in the display compartment, a hopper above and opening into said chute, and an endless conveyor for conveying articles from a point below said compartment and chute outlet to said hopper for discharge through said chute into said compartment whereby to make it appear that the articles are continuously issuing from the housing.

HERBERT E. PRATT.